Figure 1:
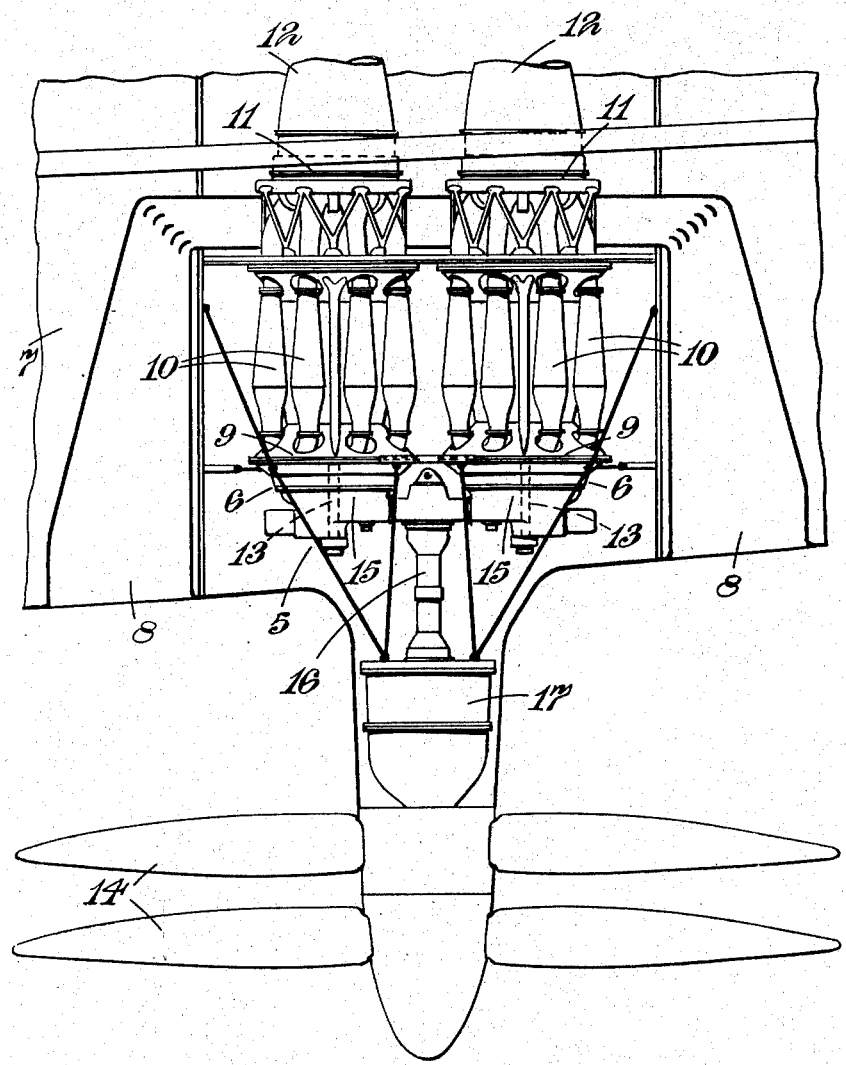

Sept. 9, 1952     F. C. I. MARCHANT     2,609,707
TRANSMISSION GEARING FOR POWER PLANTS Filed April 9, 1947     3 Sheets-Sheet 1

Inventor
Francis C. I. Marchant
by Wilkinson & Mawhinney
Attorneys

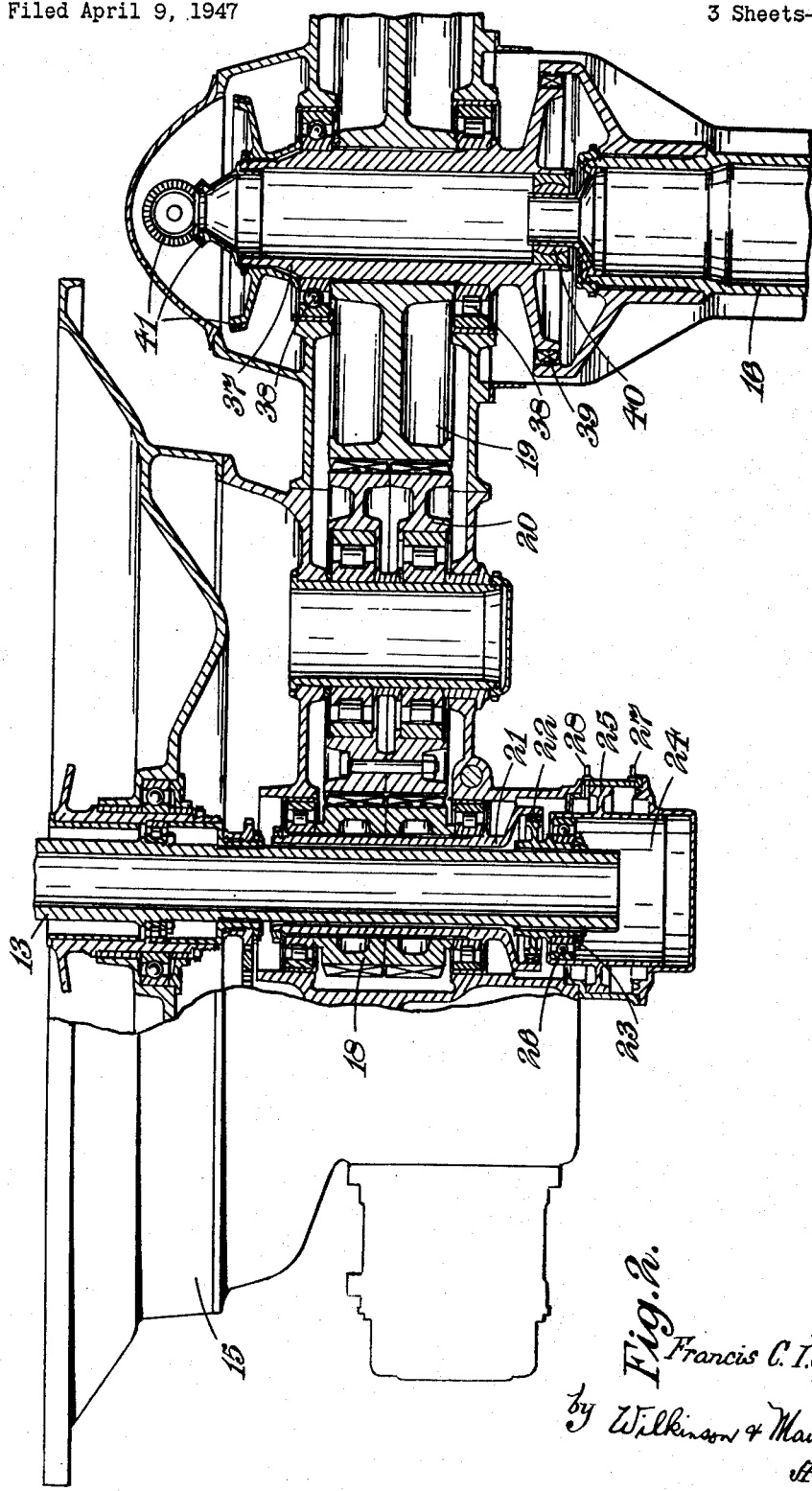

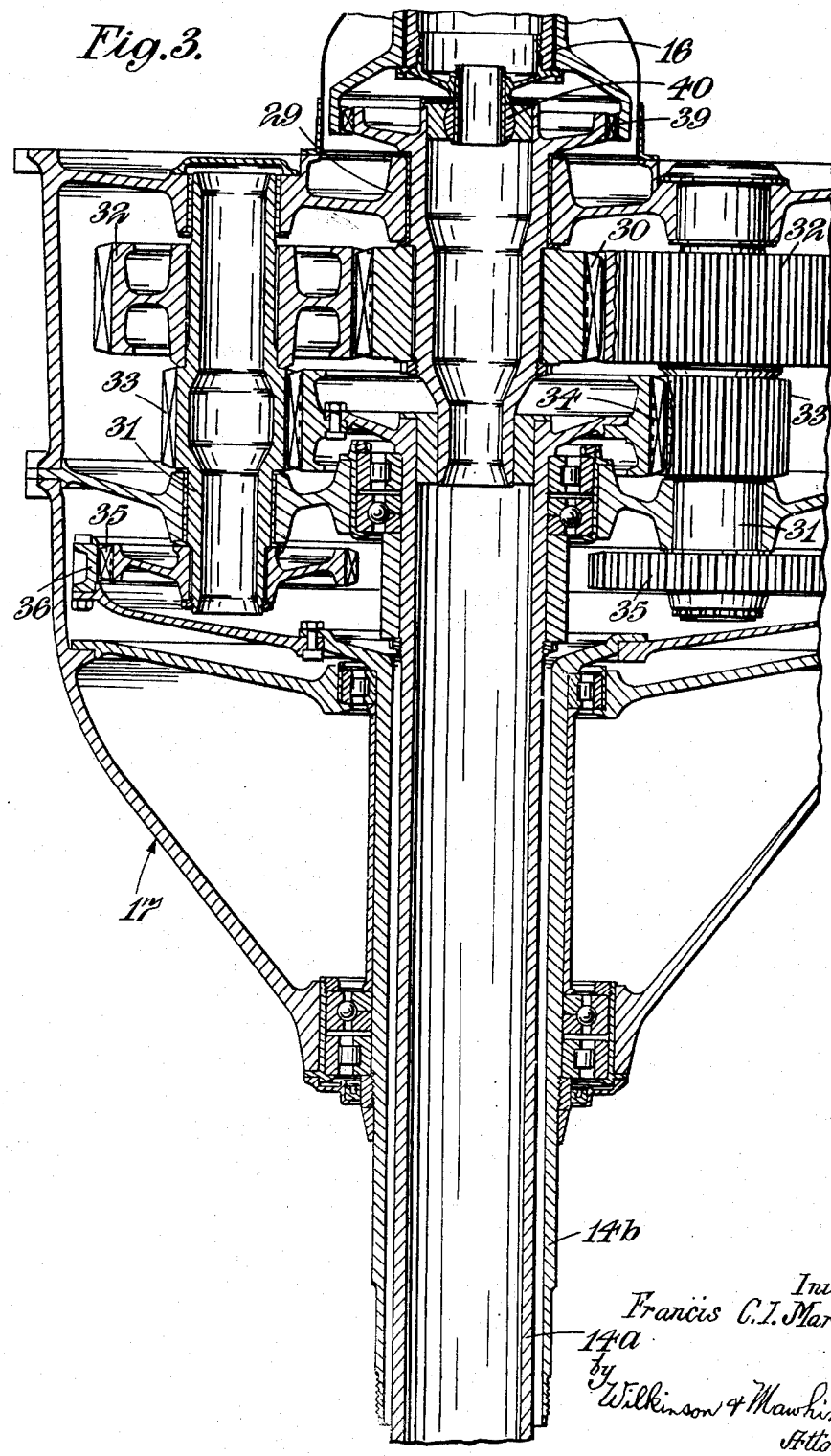

Patented Sept. 9, 1952

2,609,707

UNITED STATES PATENT OFFICE 2,609,707

TRANSMISSION GEARING FOR POWER PLANTS

Francis Charles Ivor Marchant, Bristol, England, assignor to The Bristol Aeroplane Company Limited, Bristol, England, a British company Application April 9, 1947, Serial No. 740,498
In Great Britain March 19, 1946

Section 1, Public Law 690, August 8, 1946
Patent expires March 19, 1966

3 Claims. (Cl. 74—665)

This invention relates to power plants, particularly for aircraft, and has for its object to provide an improved construction and arrangement enabling two or more engines to be used to drive two or more output shafts—such as carry airscrews—in various combinations, and in particular relates to an improved construction of transmission gearing coupling the engines and the output shafts. By the term "engines" is to be understood internal-combustion engines of the reciprocating type or gas-turbine power units.

According to the present invention there is provided in a power plant the combination with two or more engines and counter-rotating output shafts therefor, of a driving connection between the engines and the shafts which comprises a first reduction gear for each engine to drive a shaft common thereto and a second gearing disposed between said shaft and each output shaft to effect a further speed reduction and rotation of the shafts in opposite directions.

Preferably there is associated with each engine means for independently coupling it to, and uncoupling it from, said first gearing, said means being actuated either at the direction of the operator or automatically under predetermined conditions.

The long axes of the engines may be disposed parallel to each other and said output shafts placed in front of the units with their common axis of rotation between and parallel to said long axes, said connecting shaft being co-axial with the common axis of the output shafts and extending from the first to the second gearing aforesaid.

Preferably the common shaft is connected to each of the first and second gearings by means of a flexible joint.

A specific embodiment of the present invention will now be described, by way of example, as applied to a power plant for driving counter-rotating airscrews of an aeroplane. The description will be made with reference to the accompanying drawings whereof:

Figure 1 is a plan view of the power plant showing it installed in the wing of the aeroplane, Figure 2 is a sectional plan view of the first reduction gearing for one engine of the power plant, and Figure 3 is a sectional plan view of the second reduction gearing.

Referring to Figure 1: the power plant, which is generally indicated by the reference numeral 5, comprises a pair of engines or power units 6 the long axes of which extend chordwise of the wing 7 within which the plant 5 is buried. Each unit 6 comprises an air intake 8, a compressor 9, a plurality of combustion chambers 10, a gas turbine 11 and a jet pipe 12. Each turbine 11 has a pair of independently rotating rotors (not shown). One rotor being provided to drive the compressor 9 and the other the shaft 13. Air enters the intake 8 at the leading-edge of the wing 7 and the exhaust gases from the turbine 11 are ejected through the jet pipes 12 at the trailing edge.

There is provided between each unit 6 and a pair of counter-rotating airscrews 14, a driving connection comprising a first reduction gearing, generally indicated at 15, which connects each unit with a common transmission shaft 16 and a second reduction gearing 17 which connects the common shaft to the airscrews 14. As is clear from Figure 1 the axis of the common shaft 16 is parallel with the long axis of the units and lies between them. The shaft 16 extends chordwise of the wing 7 from the first reduction gearings 15 to the second gearing 17.

The first reduction gearings 15 each comprises a pinion 18 (Figure 2) connected to the output shaft 13 of unit 6, a gear wheel 19 connected to the common intermediate shaft 16 and an idler 20 which meshes with the pinion 18 and the gear 19. For convenience in construction the pinion 18 and the idler 20 are formed as two separate gears. The gearing is designed to give a reduction in speed from that of the output shaft 13 of each power unit. From this description it will be appreciated that the wheel 19 is common to the two reduction gearings 15.

The pinion 18, as shown in Figure 2, is mounted on a shaft 21 formed with one element of a clutch which is generally indicated by the reference numeral 22. The other element of the clutch comprises a sleeve 23 mounted by splines on shaft 13 for reciprocation thereon. The movements of the sleeve 23 are effected by an hydraulic motor 24 the ram 25 of which is coupled (through roller bearing 26) to the sleeve 23 so that when pressure fluid is fed to the motor 24 by pipe 27 the clutch is engaged and when the pressure fluid is fed by pipe 28 to the motor the clutch is disengaged. The clutch 22 may be operated in this way at the will of the pilot or flight engineer.

The second gearing 17 comprises an input shaft 29 driven by the shaft 16, a pinion 30 mounted thereon, a plurality of layshafts disposed parallel with and around the input shaft and two sets of gears one associated with the forward airscrew 14a and the other with the rear airscrew 14b. In the particular construction being described a total of five layshafts 31 are provided, each of which carries a gear 32 meshing with the pinion 30. Each layshaft 31 carries another pinion 33 which meshes with a gear 34 lying within the layshafts 31 and carried by the front airscrew shaft 14a. Each layshaft also carries a gear 35 which meshes with an annular gear 36 carried by the rear airscrew shaft 14b.

The second gearing 17 provides a further reduction in speed as between the shaft 16 and the airscrews 14 and also transmits drive to the airscrews so that they rotate in opposite directions.

The gear wheel 19 (Figure 2) is carried by a shaft 37 which is supported in bearings 38 and is in continuous driving engagement with the common shaft 16 by a toothed or splined connection generally indicated by the reference numeral 39. The shaft 16 is supported from shaft 37 by a ball-and-socket joint 40 so that limited lateral movements of the shaft 16 are permitted relatively to the power plant. For the same purpose the common shaft 16 is connected with the input shaft 29 of gearing 17 by a toothed connection 39 and a ball-and-socket joint 40, as shown in Figure 3. This form of connection enables the common shaft 16 to be readily disconnected from the shafts 29 and 37 during removal of the gearing 17 and shaft 16.

The shaft 37 carries gearing 41 by which auxiliaries, such as fuel pumps, oil pumps, vacuum pumps, compressors, generators and so on, for the power plant or aeroplane are driven.

It is a particular advantage of the present invention that the reduction in speed between each power unit 6 and the airscrews 14 is performed in two stages since the reduction called for is considerable when the power units comprise gas turbines.

Although the invention has been described as applied to a power plant for an aeroplane it is not so limited and may be installed in boats, land vehicles (such as locomotives), or be used in stationary installations.

I claim:

1. Transmission gearing for multi-engine power plants comprising a pair of parallel engine shafts, an intermediate shaft common to said engine shafts and disposed parallel therewith, a first reduction gearing drivingly connecting the engine shafts to said common shaft, means for independently coupling each engine shaft to, and uncoupling it from, said first reduction gearing, a pair of oppositely rotating output shafts, said output shafts being coaxially nested one within the other and lying between and parallel with said engine shafts, the intermediate shaft being coaxial with the output shafts, and a second gearing drivingly connecting the common shaft to the output shafts, said common shaft extending from the first to the second gearing and being connected to each of the first and second gearings by means of a flexible joint said second gearing effecting a further speed reduction and also rotation of the output shafts in opposite directions.

2. Transmission gearing for multi-engine power plants comprising a pair of parallel engine shafts, an intermediate shaft common to said engine shafts and disposed parallel therewith, a reduction gearing drivingly connecting each of the engine shafts to said common shaft, means associated with each engine shaft for independently coupling each shaft to, and uncoupling it from, the reduction gearing associated therewith, a pair of output shafts and a second gearing drivingly connecting the common shaft to the output shafts, said second gearing effecting a further speed reduction and also rotation of the output shafts in opposite directions, said second reduction gearing comprising a single input shaft driven by the common shaft, said output shafts being coaxial with the input shaft, a plurality of layshafts disposed around said shafts, a driving connection from the input shafts to the layshafts and from the latter to each output shaft, said driving connection comprising a pair of axially-spaced layshaft pinions one of which meshes with a wheel lying within the pinions and carried by the inner output shaft and the other of which meshes with an internally toothed gear carried by the other output shaft.

3. Transmission gearing for multi-engine power plants comprising a pair of parallel engine shafts, an intermediate shaft common to said engine shafts and disposed parallel therewith, a first reduction gearing for each of said engine shafts drivingly connecting said engine shafts to said common shaft, each of said reduction gearings including a clutch and means for operating said clutches independently of each other, so that each engine shaft can be independently coupled to or uncoupled from its reduction gearing, a pair of coaxially nested output shafts lying between the engine shafts and parallel therewith, and a second gearing drivingly connecting the common shaft to the output shafts, said second gearing effecting a further speed reduction and also rotation of the output shafts in opposite direction.

FRANCIS CHARLES IVOR MARCHANT.

REFERENCES CITED

The following references are of record in the file of this patent:

UNITED STATES PATENTS

| Number | Name | Date |
|---|---|---|
| 1,253,710 | Ogawa | Jan. 15, 1918 |
| 1,680,672 | Fawick | Aug. 14, 1928 |
| 1,902,374 | Pirinoli | Mar. 21, 1933 |
| 1,961,953 | Bauer | June 5, 1934 |
| 2,180,599 | Menasco | Nov. 21, 1939 |
| 2,297,400 | Friedrich | Sept. 29, 1942 |
| 2,305,373 | Adamson | Dec. 15, 1942 |
| 2,305,454 | Nallinger et al. | Dec. 15, 1942 |
| 2,396,745 | Nallinger et al. | Mar. 19, 1946 |
| 2,427,135 | Guier | Sept. 9, 1947 |
| 2,451,598 | Wilson | Oct. 19, 1948 |
| 2,496,857 | Cronstadt et al. | Feb. 7, 1950 |
| 2,513,286 | Cook | July 4, 1950 |